(12) United States Patent
David et al.

(10) Patent No.: US 11,529,869 B2
(45) Date of Patent: Dec. 20, 2022

(54) ELECTRIC DRIVE AXLE SYSTEM AND OPERATING METHOD

(71) Applicant: Dana Heavy Vehicle Systems Group, LLC, Maumee, OH (US)

(72) Inventors: Jeffrey M. David, Cedar Park, TX (US); Mark A. Davis, Opelika, AL (US); Darren J. Ziskovsky, Bowling Green, OH (US); Aaron D. Gries, Perrysburg, OH (US); Jordan M. Houser, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 69 days.

(21) Appl. No.: 17/226,456

(22) Filed: Apr. 9, 2021

(65) Prior Publication Data

US 2022/0324321 A1 Oct. 13, 2022

(51) Int. Cl.
*B60K 17/04* (2006.01)
*B60K 1/02* (2006.01)
*B60K 17/16* (2006.01)

(52) U.S. Cl.
CPC .............. *B60K 17/046* (2013.01); *B60K 1/02* (2013.01); *B60K 17/165* (2013.01)

(58) Field of Classification Search
CPC ....... B60K 17/046; B60K 17/165; B60K 1/02
See application file for complete search history.

(56) References Cited

U.S. PATENT DOCUMENTS

| | | | |
|---|---|---|---|
| 7,028,796 | B2 | 4/2006 | Kim |
| 7,164,247 | B2 | 1/2007 | Joe et al. |
| 8,317,648 | B2 | 11/2012 | Robinette et al. |
| 8,641,568 | B2 | 2/2014 | Knoblauch et al. |
| 8,734,281 | B2 | 5/2014 | Ai et al. |
| 9,028,362 | B2 | 5/2015 | He et al. |
| 9,156,348 | B1 | 10/2015 | Swales et al. |
| 9,580,065 | B2 | 2/2017 | Bangura et al. |
| 2008/0230284 | A1 | 9/2008 | Schoon |
| 2010/0025131 | A1 | 2/2010 | Gloceri et al. |
| 2010/0187905 | A1 | 7/2010 | Tang |
| 2013/0203551 | A1 | 8/2013 | Mellet et al. |
| 2015/0298574 | A1 | 10/2015 | Bramson |
| 2016/0368361 | A1 | 12/2016 | Endo et al. |
| 2017/0197613 | A1 | 7/2017 | Gv et al. |
| 2020/0023734 | A1 | 1/2020 | Crotti et al. |
| 2021/0095744 | A1 | 4/2021 | David et al. |

FOREIGN PATENT DOCUMENTS

| | | | | |
|---|---|---|---|---|
| DE | 102012219947 A1 | | 5/2013 | |
| KR | 20200051915 A | | 5/2020 | |
| WO | WO-2017198356 A1 | * | 11/2017 | ............. B60K 17/16 |
| WO | 2019042386 A1 | | 3/2019 | |
| WO | 2019195229 A1 | | 10/2019 | |

* cited by examiner

*Primary Examiner* — Tinh Dang
(74) *Attorney, Agent, or Firm* — McCoy Russell LLP (57) ABSTRACT

Methods and systems for an electric drive assembly are provided herein. In one example, an electric drive system is provided that includes two multi-motor drive units with associated planetary gear reductions that have asymmetric gear ratios. The planetary gear reduction in each drive unit includes a ring gear and a sun gear that are rotationally coupled to a pair of motors and a carrier rotationally coupled to an output gear that interfaces with a gear reduction of an axle assembly.

20 Claims, 6 Drawing Sheets

ELECTRIC DRIVE AXLE SYSTEM AND OPERATING METHOD

TECHNICAL FIELD

The present disclosure relates to a system with multiple electric drive axles and a coordinated electric axle control method.

BACKGROUND AND SUMMARY

Electric drive systems, such as electric drive axles, have been provided in vehicles owing in part to their modularity. However, certain electric drive axles have made performance tradeoffs between launch torque and cruising speed efficiency. Further, other drive axles have posed packaging constraints on surrounding components or vice versa. Packaging multi-motor drive axles between frame rails can prove difficult in some vehicle platforms, for instance. These packaging constraints and the inability to reach performance targets with regard to off the line acceleration, in certain scenarios, may hinder the drive axle's applicability and ultimately customer appeal.

WO 2019/195229 A1 to David et al. teaches a powertrain where in one embodiment multiple motors are coupled to a continuously variable traction drive transmission. In this powertrain embodiment, two motors are attached to a planetary gear reduction with a high ratio. Within the planetary assembly, the sun and ring gears function as the transmission's inputs and the carrier functions as the transmission's output.

The inventors have recognized several drawbacks with the powertrains taught by David. For instance, the above described powertrain embodiment may demand tradeoffs to be made with regard to vehicle launch and cruising performance, due to system architecture. As an example, the range of transmission ratios in David's powertrain may be selected to favor off the line acceleration at the expense of high speed cruising efficiency or vice versa. Further, David is silent with regard to the powertrain's specific end-use component layout. In practice, David's system and other prior powertrains may therefore impose space constraints on surrounding vehicle components (e.g., the frame, battery system, passenger cabin, auxiliary systems, etc.) in certain vehicle platforms. These space constraints may precipitate modification or redesign of certain vehicle systems to accommodate for the space inefficient transmission. Vehicle production times and costs may be resultantly driven up.

To address at least a portion of the abovementioned issues, the inventors have developed an electric drive system. The electric drive system includes a first multi-motor drive unit with a first planetary gear reduction that transfers power between a first set of motors and a first set of axle shafts. The electric drive system further includes a second multi-motor drive unit with a second planetary gear reduction that transfers power between a second set of motors and a second set of axle shafts. Further in the system, the first and second multi-motor drive units have asymmetric gear ratios. In this way, the drive units may be tailored to efficiently operate at different speeds. For instance, one motor may provide greater launch torque at low speeds and the other motor may more efficiently operate at higher cruising speeds.

Further, in one example, a first and second motor in the first multi-motor drive unit have a common rotational axis. In such an example, the first motor and the second motor are positioned on opposing axial sides of an output gear. Positioning the motors in this manner allows for tight package space installation between the tandem axles.

In yet another example, the first and second motors in the first multi-motor drive unit have rotational axes that are arranged parallel to one another. In such an example, the first and second motors may be arranged adjacent to one another on one side of an output gear. In this way, the motors may be longitudinally arranged in the vehicle. This longitudinal motor layout allows for tight package space installation between the frame rails, for example. As such, the electric drive system may be adopted in a far wider range of vehicle platforms than previous electric drive systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-3 are drawn approximately to scale. However, alternate relative dimensions may be used, in other embodiments.

DETAILED DESCRIPTION

An electric drive system that achieves a space efficient arrangement and enhances vehicle launch and cruising performance is described herein. The drive system includes a tandem axle, with each axle having a multi-motor drive unit with asymmetric gear ratios. Within the asymmetric gear ratios, the drive units may have continuous variability, in some cases. Because of this gear ratio variability, the drive units can avoid performance tradeoffs and efficiently realize acceleration and other performance targets. For instance, the drive unit with the higher gear ratio allows for greater launch torque. Conversely, the lower gear ratio drive unit allows the powertrain to attain greater efficiency at cruising speeds and lighter loads. Further, in one example, the higher gear ratio drive unit may have a disconnect clutch. In such an example, the disconnect clutch may decouple the higher ratio drive unit to permit the other drive unit to be efficiently operated at a higher speed during vehicle cruise operation, for instance. Other coordinated control strategies may be implemented using disconnect clutch operation, such as clutch operation for load sharing to increase system efficiency.

Each of the drive units in the electric drive system may have a side by side motor layout, in one example, or a longitudinal motor layout, in another example. In this side by side motor layout, the motors are adjacent to one another with parallel rotational axes, and in the longitudinal layout, the motors are coaxial. The side by side layout allow for tight package space installations between tandem axles. On the other hand, the longitudinal motor layout allows for tight package space installations between the frame rails. Packaging the drive unit between the frame rails may decrease the likelihood of drive unit degradation from road debris and/or other objects in the vehicle's operating environment. In this way, the system can be adapted for a variety of vehicle platforms. The enhanced adaptability may increase manufacturing and servicing efficiency as well as customer appeal.

Figure 1:
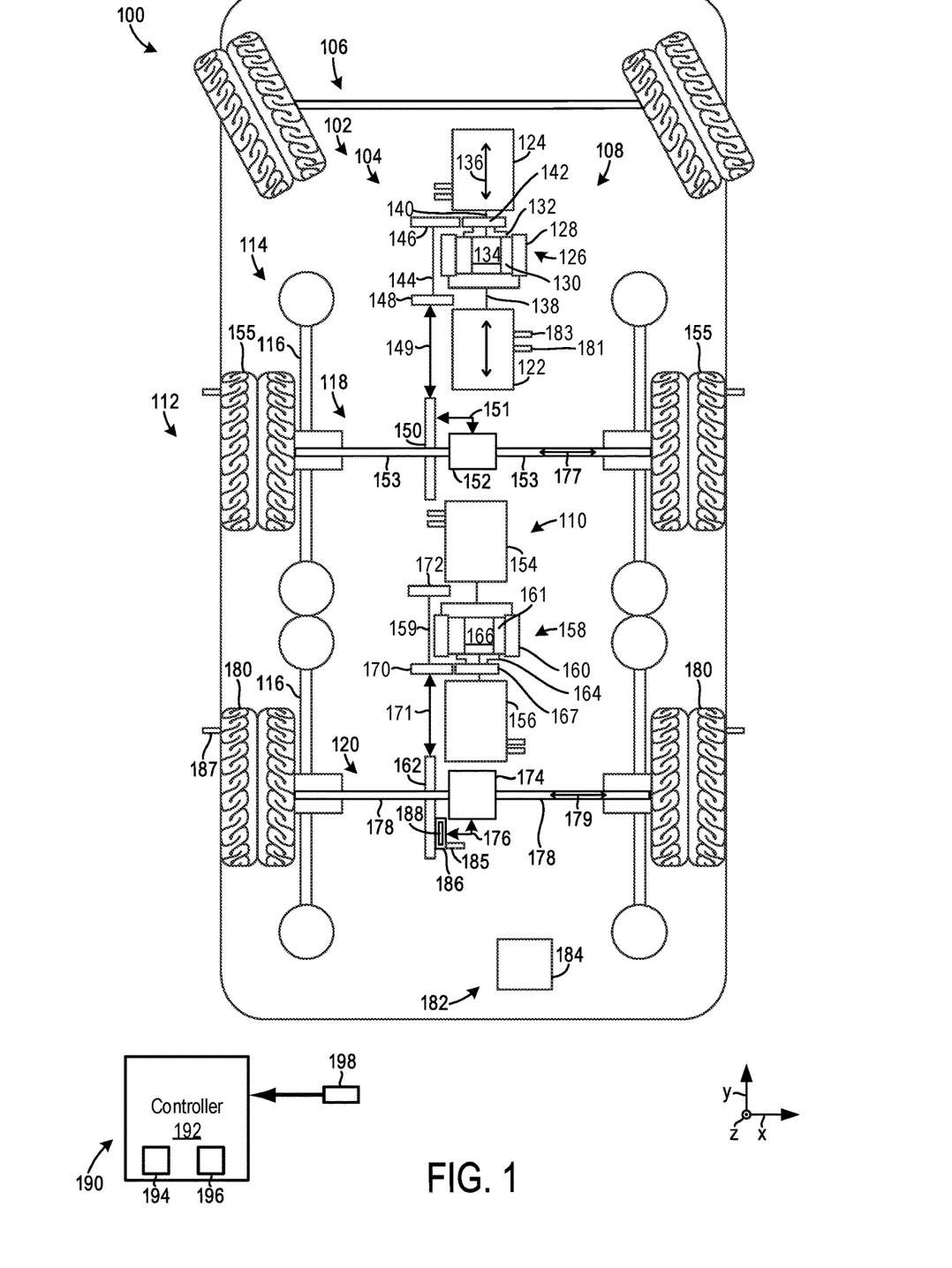
FIG. 1 is an illustration of a vehicle with an electric drive system.

FIG. 1 illustrates a vehicle 100 with a powertrain 102. The vehicle 100 may be a light, medium, or heavy duty vehicle designed for on and/or off-road travel. The vehicle 100 includes powertrain 102 with an electric drive system 104. The vehicle 100 is further illustrated with an unpowered steerable axle 106 (e.g., steerable front axle). In other examples, the steerable axle 106 may be powered via an internal combustion engine. As such, the vehicle may be a battery electric vehicle (BEV), in one example, or a hybrid electric vehicle, in other examples.

The electric drive system 104 comprises a first multi-motor drive unit 108 and a second multi-motor drive unit 110 in a tandem axle assembly 112 (e.g., non-steerable tandem axle assembly). However, in alternate arrangements, the drive units may be spaced away from one another. The multi-motor drive units may be more generally referred to as electric drive units.

A dependent suspension system 114 may further be provided in the vehicle 100, in some instances. Using dependent suspension allows the vehicle's durability and load carrying capacity to be increased when compared to independent suspension systems. Springs 116 coupled to axles 118, 120 may therefore be provided in the suspension system. However, other types of suspension systems may be used, in other examples, which may however decrease vehicle durability and load carrying capacity. Further, the axles 118, 120 may be beam axles in which the drive wheels are connected via a continuous beam or shaft.

The first multi-motor drive unit 108 includes a first motor 122 and a second motor 124 attached to a planetary gearset 126 (e.g., planetary gear reduction). As such, the first multi-motor drive unit may be referred to as a dual-motor drive unit, in one example. However, the first multi-motor drive unit may include three or more motors, in other examples. The motors 122, 124 as well as the other motors described herein may include rotors that electromagnetically interact with stators to generate mechanical and electric power, in some cases. As such, the motors may be motor-generators. The first and second motors 122, 124 may have different characteristics (e.g., size, peak power, maximum speeds, efficiency curves, etc.). In this way, the drive unit may blend motor performance characteristics to, for example, realize performance and efficiency goals. Alternatively, the motors in the first multi-motor drive unit 108 may be similar in size, which may however decrease the unit's performance and/or efficiency. Further, as described herein, a motor is a device with components (e.g., rotor, stator, housing, and the like) for generating rotational energy or, in the case of a motor-generator, receiving rotational energy and transforming it into electrical energy. The motors described herein may be alternating current (AC) type motors such as multi-phase motors. However, direct current (DC) type motors may be deployed in certain scenarios (e.g., low speed and low power vehicle platforms).

The planetary gearset 126 may be a simple planetary gearset with a ring gear 128, planet gears 130 that rotate on a carrier 132, and a sun gear 134. Thus, the planetary gearset 126 and the other planetary gearsets described herein may not have clutches or brakes to simplify construction and increase drive unit compactness. However, more complex planetary assemblies may be used, in other embodiments, which may make tradeoffs with regard to space efficiency. For instance, the planetary gearset 126 may include additional gears such as multiple sets of planet gears and/or ring gears, in alternate embodiments. In one particular example, the first drive unit may include two planetary gearsets which have ring gears and carriers that mesh with one another or a multi-stage planetary gearset. These planetary variants are also applicable to a planetary gearset 158 included in the second multi-motor drive unit 110. The planetary gearsets 126, 158 may include toothed gears which mesh with one another, in one example. Alternatively, the planetary gearsets 126, 158 and/or the other planetary assemblies described herein may be traction drives. In this traction drive example, the planetary assemblies may include sun, ring, and planet components whose mode of power transfer is through shear forces in a relatively thin layer of fluid trapped between the components. Further, as described herein, the traction drives may additionally use friction as another mode of power transfer, in some cases.

In the illustrated example, the first and second motors 122, 124 and the planetary gearset 126 are coaxial. Rotational axes 136 of the motors 122, 124 that are coaxial with the planetary gearset 126 are provided for reference. However, alternate motor and planetary gearset arrangements have been envisioned. The motor and planetary layout may be chosen based on packaging constraints imposed by other vehicle systems (e.g., the suspension system, frame, battery system, etc.), for instance. As such, when longitudinal compactness is favored, the motors may have a coaxial layout. Conversely, when used in a tandem axle and longitudinal compactness is favored, the motors may have a side by side layout, described in greater detail herein with regard to FIG. 3.

Further, in the illustrated example, the rotational axes of the motors and the planetary gearset are perpendicular to the rotational axis 177 of the first axle 118. In an alternate example, the motors and the planetary gearset may be arranged coaxial to one another and parallel to the first axle.

In the planetary gearset 126, the ring gear 128 is coupled to an output shaft 138 of the first motor 122. Further, the sun gear 134 is coupled to an output shaft 140 of the second motor 124. Therefore, the ring and sun gears may serve as the inputs for the planetary assembly. On the other hand, the carrier 132 may serve as the planetary assembly's output. To elaborate, a gear 142 may be coupled to the carrier 132 which functions as a power interface for downstream components.

An output shaft 144 with a first gear 146 that meshes with the gear 142 and a second gear 148 that meshes with an output gear 150 are further shown in FIG. 1. Arrows 149 denote the mechanical connection (e.g., mesh) formed between the output gear 150 and the second gear 148. In one example, the mechanical connection between the gears 148, 150 may take the form of a hypoid gear reduction with gears that are perpendicular to one another. Alternatively, the mechanical connection formed between the gears 148, 150 may take the form of a helical gear reduction. In either case, the gears 148, 150 may function as a final drive arrangement. A final drive refers to the last gear reduction in the drivetrain upstream of a corresponding differential. Although, the first and second multi-motor drive units 108, 110 are illustrated longitudinally forward of the drive axles 118, 120, respectively, at least a portion of each drive unit may be arranged longitudinally rearward of the drive axles, in other embodiments. For instance, the motors 122, 156 may be arranged rearward of the axles 118, 120, respectively.

Further, the output gear 150 may be coupled to a first differential 152. Arrows 151 indicate the mechanical connection between the first differential 152 and the output gear 150. Open differentials, locking differential, and limited slip differentials have been contemplated for use in the powertrain. The type of differential used in the system may be selected based on end-use traction performance objectives. Further the first differential 152 is included in the first axle 118 that additionally includes axle shafts 153. In turn, the axle shafts 153 are rotationally coupled to drive wheels 155.

The second multi-motor drive unit 110 may have certain similarities with the first multi-motor drive unit 108. For instance, the second multi-motor drive unit 110 again includes a first motor 154, a second motor 156, a planetary gearset 158 (e.g., planetary gear reduction), a shaft 159, and an output gear 162. Again, the first and second motors may be asymmetrically sized to increase drive unit performance and efficiency, although drive unit configurations employing similarly sized motors have been envisioned. Further, when the second multi-motor drive unit 110 includes two motors it may be referred to as a dual-motor drive unit, in one example. Alternatively, in other examples, the second multi-motor drive unit may include three or more motors.

Although the multi-motor drive units may have a common component architecture, the ratios of the drive units are asymmetric. To elaborate, the second multi-motor drive unit 110 has a smaller gear ratio than the first multi-motor drive unit 108. In one specific example, the second multi-motor drive unit may have a ratio that is less than 10:1 (e.g., 7:1) and the first multi-motor drive unit may have a ratio greater than 10:1 (e.g., 12:1). This asymmetric gear ratio between the drive units allows each unit to have separate performance and efficiency characteristics that can be blended to achieve a more expansive set of performance and efficiency targets in the system. For example, the first drive unit may generate higher torque at low speed, such as during vehicle launch, and the second drive unit may operate with greater efficiency at higher cruising speeds. In this way, the vehicle can not only accelerate more quickly off the line but also achieve greater efficiency while cruising. Consequently, both vehicle performance and efficiency can be enhanced across a wider range of operating conditions. The control strategies of the drive units are discussed in greater detail herein with regard to FIGS. 4-7.

The planetary gearset 158 may include a ring gear 160, planet gears 161 rotating on a carrier 164, and a sun gear 166. Thus, the planetary gearset 158 may be a simple planetary gearset. Although, as noted above, the planetary gearset may have a more complex layout. Again, the ring gear 160 and the sun gear 166 may function as the planetary assembly's inputs and the carrier 164 may function as the planetary output with a gear 167 coupled thereto. Further, gears 170, 172 reside on shaft 159 which mesh with gear 167 and the output gear 162, respectively. Arrows 171 denote the mechanical connection formed between the output gear 162 and the gear 170. Again, the mechanical connection may be a hypoid or helical gear mesh.

The output gear 162 is rotationally coupled to a second differential 174, as indicated via arrows 176. The differential 174 may be an open differential, locking differential, limited slip differential, and the like. Further, the differential 174 is included in the axle 120, which includes axle shafts 178. In turn, the axle shafts are rotationally coupled to drive wheels 180.

The first and second multi-motor drive units 108, 110 each have similar coaxial layout of the motors and planetary gearsets. However, other drive unit arrangements, discussed herein with regard to FIGS. 2-3, have been envisioned.

Each of the first and second multi-motor drive units 108, 110 may be continuously variable (e.g., infinitely variable). As such, each drive unit may have a continuous range (e.g., infinite range) of gear ratios within the drive unit's overall gear ratio range. To achieve the continuous variable ratio adjustability, continuous speed and/or torque control of the motors 122, 124 and/or motors 154, 156 may be coordinated to reach a ratio set-point. Gains in powertrain efficiency and vehicle performance are achieved when the drive units are designed for continuous variability. However, other types of drive units may be used, in other embodiments, which may however demand trade-offs with regard to efficiency and performance, in some cases.

The motors in each multi-motor drive unit may receive electrical energy from an energy storage system 182 (e.g., a battery system). The energy storage system may include one or more energy storage devices 184 (e.g., batteries, capacitors, flywheels, and the like). The vehicle may further include an inverter between the batteries and the drive unit motors, when the motors 122, 124, 154, 156 are multi-phase motors or other suitable type of AC motors.

Further in one example, a disconnect clutch 186 may be arranged downstream of the planetary gearset 158. For instance, the disconnect clutch 186 may be coupled to the output gear 162 as illustrated. Arranging the disconnect clutch adjacent to the output gear permits a smaller number of components to be rotating with the output when the disconnect is active in comparison to systems with the disconnect clutch arranged further upstream in the multi-motor drive unit. However, in other examples, the disconnect clutch may be arranged at a different location, such as further upstream in the multi-motor drive unit. Sets of plates 188 may be included in the disconnect clutch 186 to accomplish the power transfer between the second multi-motor drive unit 110 and the axle 120. In this way, the disconnect clutch may be engaged and disengaged to permit and inhibit power transfer between the components it is rotationally coupled to.

A control system 190 with a controller 192 may further be incorporated in the powertrain 102. The controller 192 includes a processor 194 and memory 196. The memory 196 may hold instructions stored therein that when executed by the processor cause the controller 192 to perform the various methods, control strategies, etc., described herein. The processor 194 may include a microprocessor unit and/or other types of circuits. The memory 196 may include known data storage mediums such as random access memory, read only memory, keep alive memory, dual-memory, combinations thereof, etc.

The controller 192 may receive vehicle data and various signals from sensors positioned in different locations in the electric drive system 104 and/or the vehicle 100. The sensors may include motor speed sensors 181, motor temperature sensors 183, disconnect clutch sensor 185, wheel speed sensors 187, and the like. In this way, gear speed at the input and the output of the system may be detected along with the gear speed at the output of the first planetary gearset 148. However, in other examples, the speeds of at least a portion of the gears may be modeled by the controller.

The controller 192 may send control signals to actuators in the motors 122, 124, 154, 156. Responsive to receiving the control signals, motor speed may be adjusted, for instance. Further, control commands may be sent to the disconnect clutch 186. The other controllable components in the electric drive system may function similarly with regard to control commands and actuator adjustment. The electric drive system 104 may include an input device 198 (e.g., an accelerator pedal, a control-stick, levers, buttons, combinations thereof, and the like). The input device 198, responsive to operator input, may generate a vehicle power request.

Figure 2:
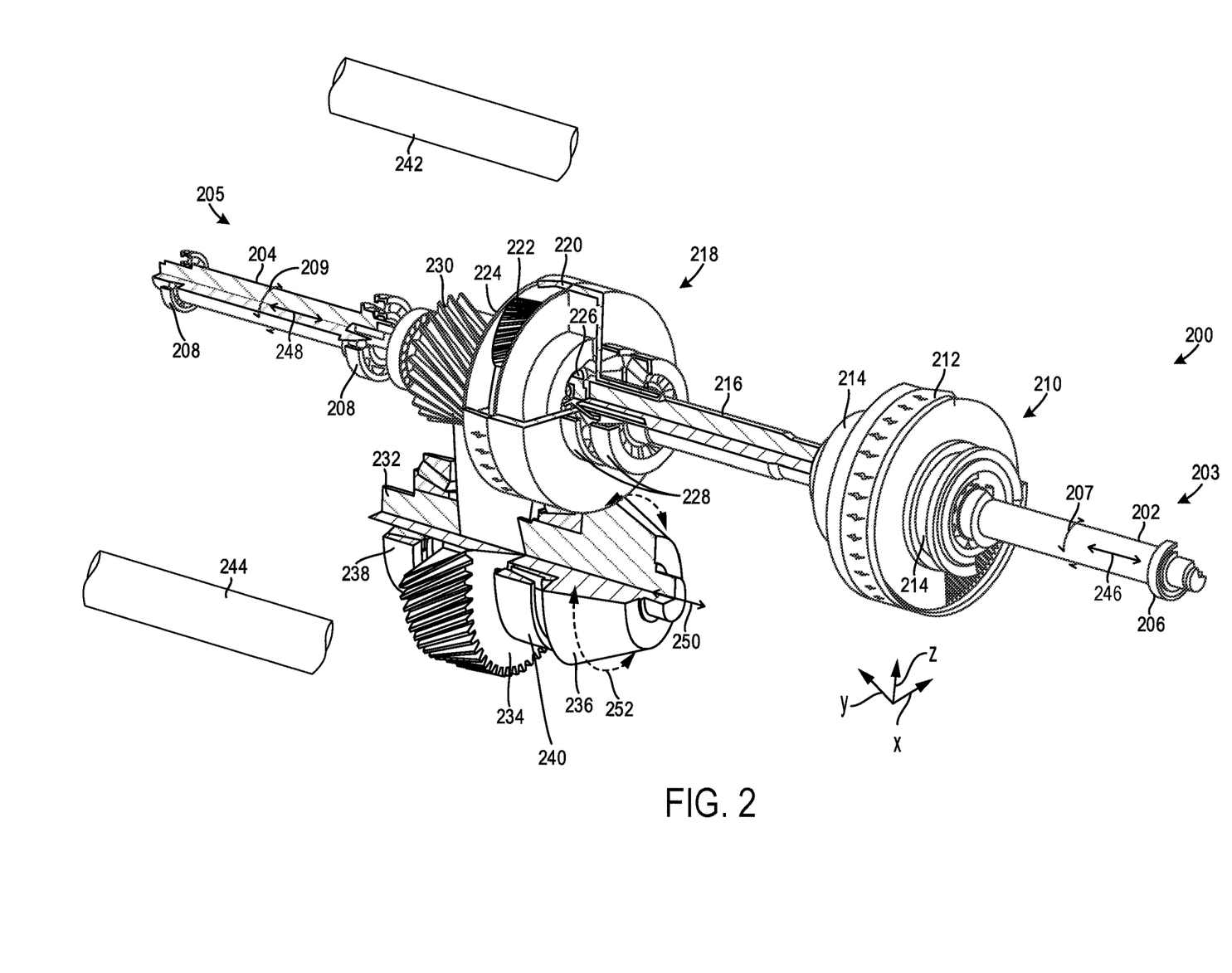
FIG. 2 is a first example of a multi-motor drive unit.
Figure 3:
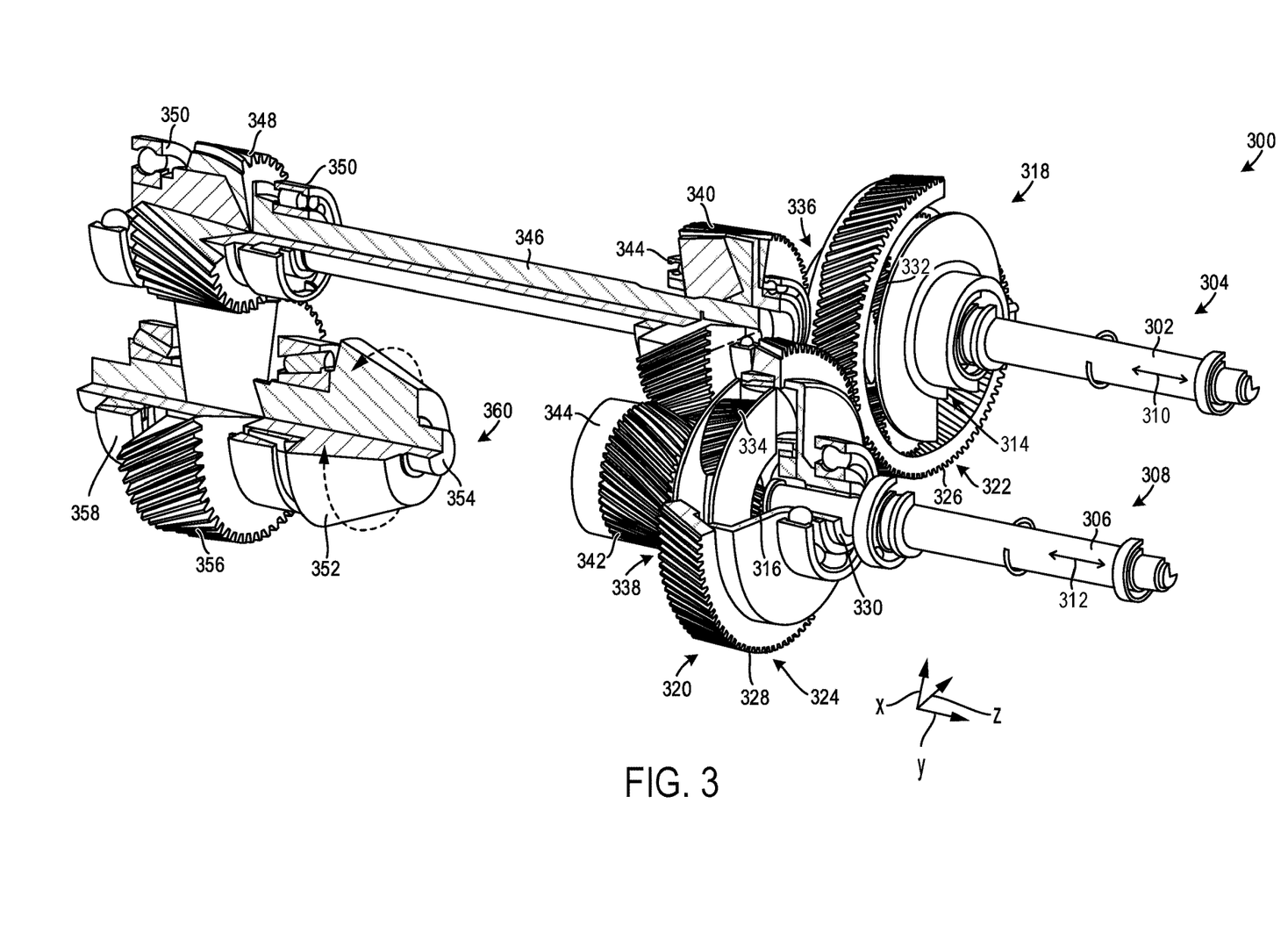
FIG. 3 is a second example of a multi-motor drive unit.

An axis system is provided in FIG. 1 as well as FIGS. 2-3 for reference. An x-axis, y-axis, and z-axis are specifically depicted. The x-axis may be a lateral axis, the y-axis may be a longitudinal axis, and the z-axis may be a vertical axis (e.g., an axis parallel to the gravitational axis). However, different orientations of the axes may be used, in other examples. Rotational axes 177, 179 of the axles are further provided for reference.

FIG. 2 illustrates a first example of a multi-motor drive unit 200. The multi-motor drive unit 200 may specifically serve as an example of one of the drive units 108, 110 depicted in FIG. 1. As such, the drive units 108, 110, shown in FIG. 1, and the drive unit 200 shown in FIG. 2 may share common structural and/or functional features. In certain configurations, the drive units 108, 110, shown in FIG. 1, may each have an architecture similar to the multi-motor drive unit 200 shown in FIG. 2. Redundant description is omitted for brevity.

The multi-motor drive unit 200 includes a first rotor shaft 202 that is included in a first motor 203 and a second rotor shaft 204 that is included in a second motor 205. It will be appreciated that the motors include rotors electromagnetically interacting with stators. As shown in FIG. 2, both rotor shafts may be designed to rotate in opposing directions, indicated via arrows 207, 209. Specifically, in one example, during drive operation, the motors may be rotated in opposite directions. In this way, the drive generated by the units is symmetrically reversible, and can seamlessly change directions when desired.

Bearings 206, 208 may be coupled to the rotor shafts 202, 204. The bearings described herein may include races and rotational elements (e.g., balls, cylinders, tapered cylinders, etc.) that support and constrain rotation of the component(s) to which they are attached. A first planetary gearset 210 may be coupled to the first rotor shaft 202. The planetary gearset 210 may include ring gear 212, planet gears on a carrier, and a sun gear. Bearings 214 may be positioned on opposing sides of the planetary gearset 210.

The first rotor shaft 202 is coupled to the sun gear, and the ring gear 212 is coupled to a connection shaft 216. The connection shaft 216 extends between the first planetary gearset 210 and a second planetary gearset 218. The second planetary gearset 218 includes a ring gear 220, planet gears 222 on a carrier 224, and sun gear 226.

Two bearings 228 are coupled to the second planetary gearset 218. Further, a gear 230 is coupled to the carrier 224. The second rotor shaft 204 is coupled to the sun gear 226. In this way, the sun and ring gears function as the planetary gearset's inputs and the carrier functions as the output.

A shaft 232 with a pinion gear 234 and an output gear 236 (e.g., hypoid gear) may further be included in the multi-motor drive unit 200. However, other gear arrangements may be used, in other examples. The pinion gear 234 meshes with the gear 230 and the output gear 236 may be coupled to downstream components such as the differential or a shaft functioning as the differential's input. The differential's rotational axis may be arranged perpendicular to the shaft 232. Further, bearings 238, 240 may be coupled to the shaft 232. The output gear 236 may be radially offset from the motors 203, 205 and the planetary gearsets 210, 218. In this way, the output gear may be positioned to efficiently attach to the axle differential.

The rotor shafts 202, 204 are arranged coaxial to one another, in the illustrated example. In this way, the motors are longitudinally arranged. Because of the longitudinal arrangement, the drive system may be more efficiently packaged in the vehicle. For instance, the longitudinal arrangement may be used to fit the drive unit between two opposing frame rails 242, 244. Consequently, in one use-case example, the drive unit may be placed higher in the vehicle when compared to vehicles the electric drive systems that are wider than the frame, which may demand unit placement below the frame rails. The higher placement of the drive unit makes it less susceptible to degradation from interaction with objects such as road debris and may be more space efficiently incorporated into a wide variety of vehicle platforms.

Further, as illustrated, the output gear 236 is offset from the rotational axes 246, 248 of the rotor shafts 202, 204. Further, the rotational axes 246, 248 are coaxial and coaxial with the central rotational axes of the planetary gearsets 210, 218. The output gear 236 may further be interposed by the motors 203, 205 (e.g., housings of the motors). In other words, the motors may be positioned on axial opposing sides of the output gear 236. In this way, downstream components can be easily connected to the multi-motor drive unit while retaining a space efficient layout. The layout depicted in FIG. 2 allows the multi-motor drive unit 200 to compactly be arranged between frame rails 242, 244 and therefore positioned higher in the vehicle to guard the unit against degradation from road debris and other environmental factors.

A rotational axis 250 of the shaft 232 is further provided for reference. As shown, the shaft may be rotated in opposing rotational directions, as indicated via arrows 252. The rotational axis 250 may be parallel to the rotational axes 246, 248. Further, as shown in FIG. 2, the output gear 236 is axially offset from the planetary gear set 218.

FIG. 3 shows a second example of a multi-motor drive unit 300. The multi-motor drive unit 300 may specifically serve as an example of one of the multi-motor drive units 108, 110 depicted in FIG. 1. In certain configurations, the multi-motor drive units 108, 110, shown in FIG. 1, may each have a component architecture similar to the multi-motor drive unit 300, shown in FIG. 3. However, in other examples, one of the multi-motor drive units 108, 110 shown in FIG. 1 may have an architecture similar to the multi-motor drive unit 300 depicted in FIG. 3 and the other unit may have a similar architecture to the multi-motor drive unit 200, shown in FIG. 2. Alternatively, to simplify manufacturing and allow for commonality of components, and installation interfaces in the vehicle, the vehicle may include two of the multi-motor drive units 200 or 300, shown in FIGS. 2 and 3, respectively.

The multi-motor drive unit 300 again includes a first rotor shaft 302 in a first motor 304 and a second rotor shaft 306 in a second motor 308. However, the rotational axis 310, 312 of the rotor shafts 302, 306 are parallel to one another. Thus, the motors are arranged adjacent and offset from one another, referred to herein as a side by side layout. Because of the side by side layout the drive unit, the unit may be used where tight package space installation longitudinally between the tandem axles is desired. The motors 304, 306 may be positioned laterally between two frame rails to achieve space efficient installation.

The rotor shafts 302, 306 are each coupled to sun gears 314, 316 in planetary gearsets 318, 320, respectively. The planetary gearsets 318, 320 may be simple planetary gearsets with the ring gears 322, 324 that include teeth 326, 328 on outer surfaces that mesh with one another. Alternatively, in the traction drive embodiment, the outer surfaces of the ring gears may engage with one another via shear forces and/or friction. However, alternate gear arrangements have been contemplated. For instance, a gear coupled to a motor output shaft 330 may directly mesh with the outer teeth 328 of the ring gear 322. It will be appreciated that the planetary gearsets 318, 320 further include planet gears 332, 334 and carriers 336, 338. Power from the carriers 336, 338 is combined via gears 340, 342 coupled to the carriers and mesh with one another via outer teeth.

Bearings 344 (e.g., ball bearings) are coupled to the shafts on which the gears 340, 342 rotate. In this way, the planetary assemblies are efficiently supported. The shaft 346 on which the gear 340 rotates extends between the planetary gearset 318 and a gear 348. Again, bearings 350 may be provided on either side of the gear 348 to further support the shaft 346.

An output gear 352 resides on a shaft 354. During drive operate, the shaft 354 receives power from a mesh between the gear 348 and a gear 356. Bearings 358 may be coupled to the shaft 354. A mesh between the output gear 352 (e.g., hypoid gear) and a downstream gear coupled to a differential may form a final drive of the multi-motor drive unit. Although, other powertrain layouts may be used. Further, the motors 304, 306 may be positioned on an inboard axial side 360 of the output gear 352, to increase the unit's packaging efficiency while still permitting the unit to be quickly attached to a differential.

The layouts depicted in FIGS. 2-3 strike a desired balance between motor packaging, gearing compactness, gear ratio range, and drive unit performance. For instance, the drive unit embodied in FIGS. 2 and 3 have profiles that may efficiently fit between frame rails. Further, the drive unit embodied in FIG. 3 has a profile that enables the drive units to be spaced relatively close together along a longitudinal axis. In this way, these drive units can meet differing packaging goals in a wider variety of vehicle platforms. Consequently, the applicability of the drive units may be expanded to meet design constraints in a multitude of vehicle types, thereby increasing customer appeal.

Figure 4:
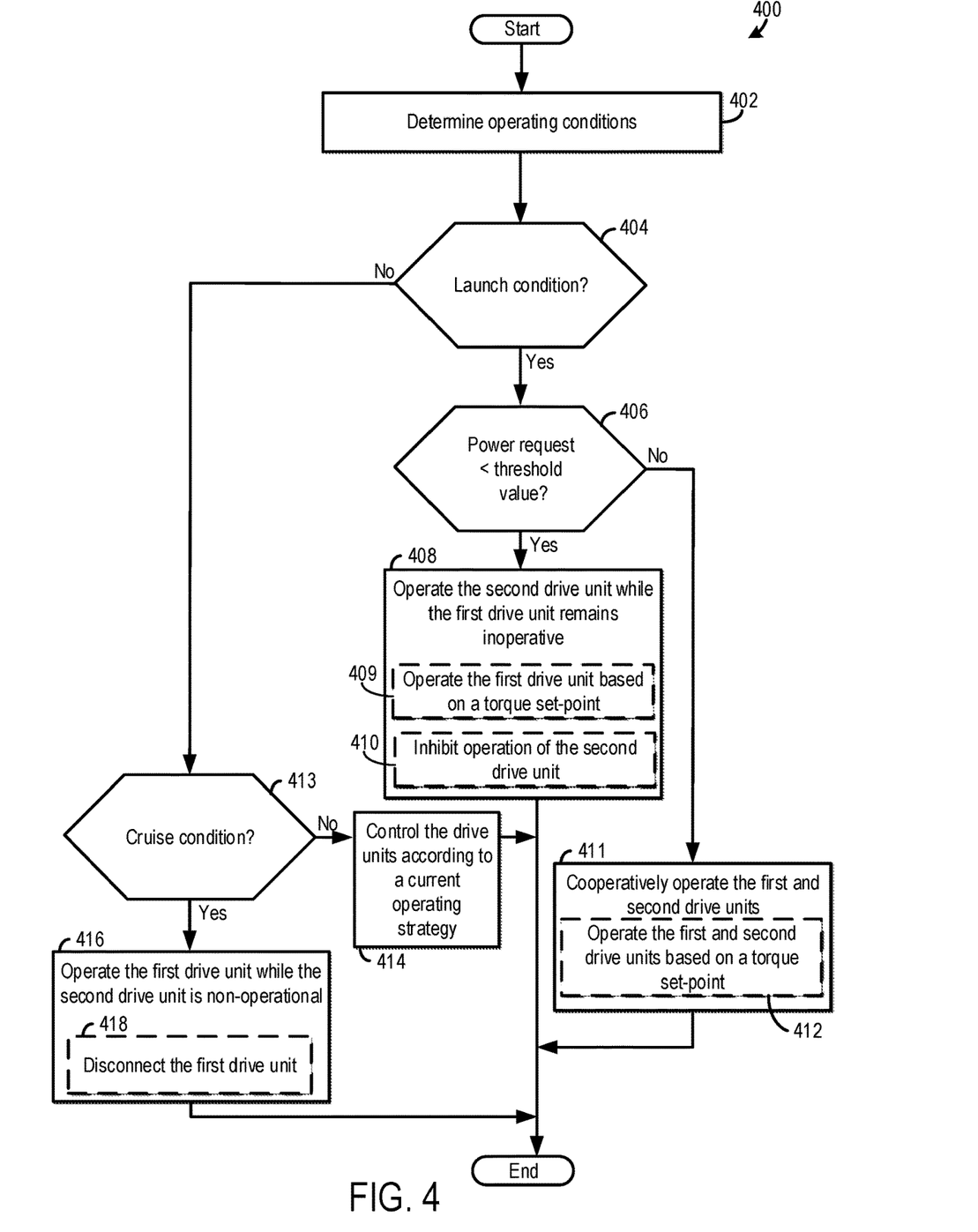
FIG. 4 is a control method for an electric drive system.

FIG. 4 shows a method 400 for operation of an electric drive system. The method 400 may be carried out by the electric drive systems and components described above with regard to FIGS. 1-3, in one example. However, in alternate examples, the method 400 may be implemented using other suitable electric drive systems and corresponding components. Further, the method 400 may be carried out as instructions stored in memory executed by a processor in a controller. As such, performing the method steps may include receiving signal input as well as sending and/or receiving commands which trigger adjustment of associated components, as previously indicated.

At 402, the method includes determining operating conditions such as vehicle speed, an operator power request, motor speed, motor torque, motor temperature, etc. These operating conditions may be ascertained using sensor inputs and/or modeling.

Next at 404, the method judges whether a launch condition is present. Such a judgement may be carried out using vehicle speed and/or the operator power request. As such, if the vehicle speed is at zero or a near zero value and a power request has been received, it may be ascertained that a launch condition is present. Conversely, if the vehicle speed is a non-zero value, a power request has not been received, and/or vehicle brakes are engaged, a launch condition is not occurring. Different launch conditions may be delineated via a non-zero power request threshold. For instance, if the operator power request is greater than the threshold, the launch condition may be characterized as a first launch condition in which dual drive unit operation may be triggered. On the other hand, if the operator power request is less than the threshold value, the launch condition may be characterized as a second launch condition in which single drive unit operation may be triggered.

If it is judged that a launch condition is present (YES at 404), the method moves to 406. At 406 the method determines if the power request is greater than a threshold value. This threshold value may separate single and dual drive unit operation during launch. The threshold values may be a predetermined or dynamic non-zero value and may be calculated based on motor size, motor efficiency objectives, vehicle weight, battery state of charge, and the like.

When the power request is below the threshold (YES at 406) the method advances to 408, where the method includes operating the second electric drive unit while the first electric drive unit remains deactivated. Step 408 may therefore include operating the first drive unit based on a torque set-point at 409 and inhibiting operation of the second drive unit at 410. Deactivation of the first drive unit may involve operation of the unit in a coast mode where the motors are not generating mechanical or electrical power. As such, during deactivation of the first drive unit, electrical energy transfer to the drive unit may cease. In yet another example, a disconnected clutch in the first drive unit may be disengaged during deactivation. When controlling the second drive unit, one or both of the motors in said unit may be operated in a torque or speed control mode to meet the operator's power request. For instance, the first motor may be operated at a torque set-point while the second motor is operated at a speed set-point, which maintains the first motor at a target speed or within a speed range. Further, in other cases, both the first and second motors in the first drive unit may be operated at different speed set-points.

However, if the power request is greater than the threshold value (NO at 406) the method moves to 411. At 411, the method includes cooperatively operating the first and second drive units. Step 411 may therefore include operating the first and second drive units based on a torque set-point, at 412. For instance, both the first and second units may be operated to generate additive forward drive. As such, each drive unit may fractionally contribute to drive wheel power and said fraction may be altered in response to changes in vehicle load, speed, motor efficiency, and battery state of charge, for example. To elaborate, the contribution of each drive unit may be adjusted based on efficiency set-points, the gear ratio of each unit, vehicle traction, and the like. For instance, both units may be operated to maintain each of the pairs of motors within a desired efficiency range to extend vehicle range. Again, both motors in each drive unit may be speed or torque controlled according to the power request. For example, one motor may be torque controlled while the other is speed controlled or vice versa.

Further, in examples, where the system includes the disconnect clutch in the higher ratio electric drive unit, load sharing strategies may be deployed that further enhance different aspects of drive system and vehicle performance such as efficiency, handling, responsiveness, etc. As such, the disconnect clutch may be partially disengaged for load sharing efficiency. The clutch may therefore increase its degree of engagement to increase load on the second drive unit and vice versa. Thus, the clutch may be operated to maintain a load splitting ratio between the electric drive units. In other cases, the disconnect clutch may be disengaged to reduce drive system drag. In yet another example, the disconnect clutch may be selectively disengaged to reduce (e.g., minimize) energy consumption of the drive units. The energy consumption targets may be modeled using battery state of charge, vehicle load, motor temperatures, motor speeds, and the like.

Conversely, if it is judged that a launch condition is not present (NO at 404) the method moves to 413. At 413, method judges if the vehicle is operating under a cruise condition. For instance, it may be judged that a cruise condition is occurring when the vehicle speed is greater than a threshold value, the operator power request is less than a threshold value, and/or the load is less than a threshold value. It will be understood that the aforementioned threshold values may be positive non-zero values. On the other hand, when the vehicle speed is less than the threshold value, the operator power request is greater than the threshold value, or the load is greater than the threshold value it may be judged that the cruise condition is not occurring.

If it is judged that vehicle cruise is not occurring (NO at 413), the method moves to 414. At 414, the method includes controlling the electric drive units according to a current operating strategy. The current operating strategy may involve the adjustment of both electric drive units in tandem based on operator power request and vehicle load or may involve sustaining the drive units in shut down when the vehicle is in park mode. To elaborate, operating both units in tandem may involve operating the first and second electric drive units concurrently to achieve an operator requested power set-point.

Conversely, the method proceeds to 416 when it is judged that vehicle cruise is occurring (YES at 413). At 416, the method includes operating the first drive unit while the second drive unit is inoperative, which may include disconnecting the second drive unit via the disconnect clutch, at 418. Additionally, the electrical power transfer the second drive unit may be terminated at step 416. It will be appreciated that both steps 408, 410, and 416 may be generally characterized as coordinating operation of the first and second electric drive units. After 408, 411, and 416, the method ends. Method 400 allows the system's operating strategy to be tailored to achieve a high torque vehicle launch and an efficient cruise operation.

Figure 5:
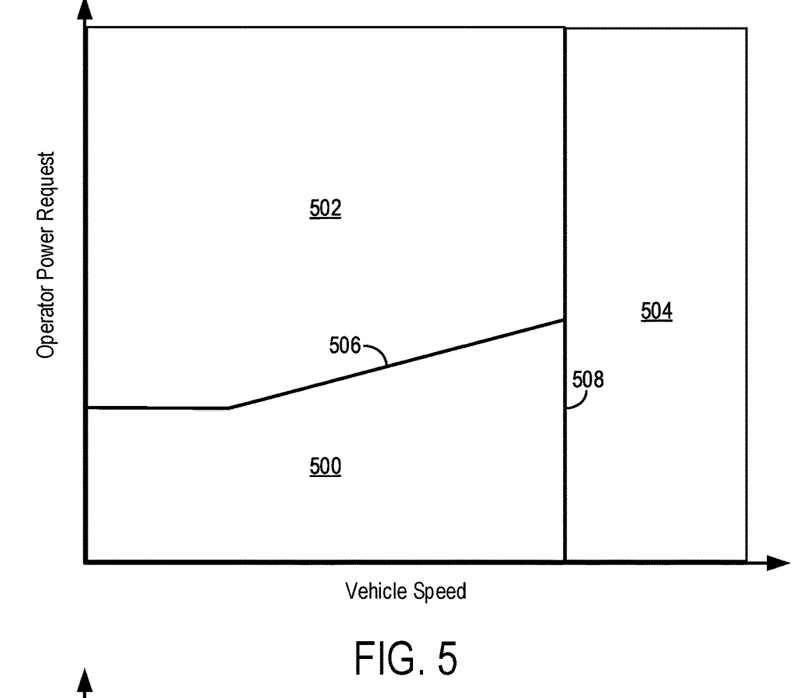
FIGS. 5-6 are graphical representations of different use-case electric drive system control techniques.
Figure 6:
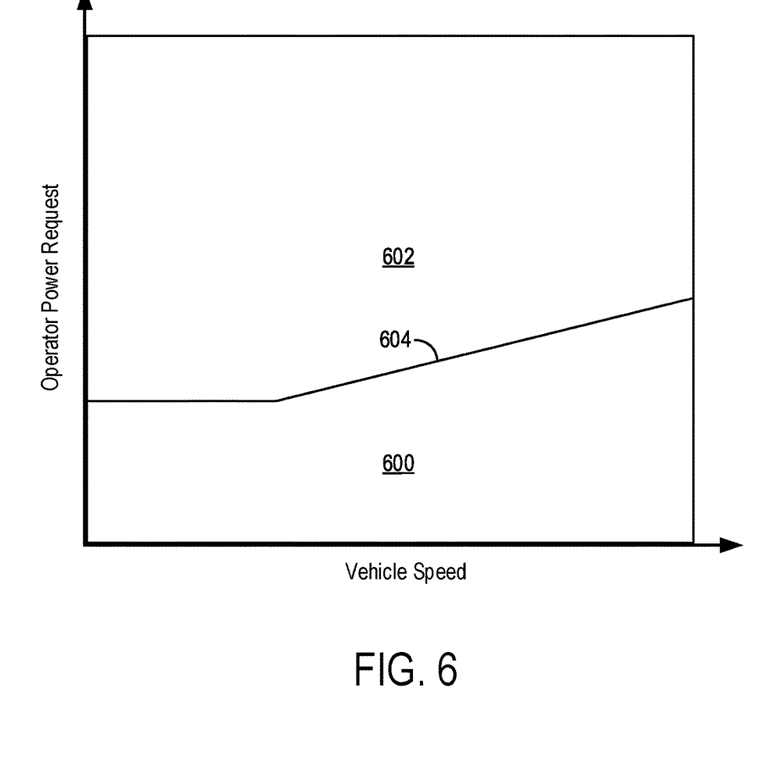

Referring to FIGS. 5 and 6, graphical relationships between an operator power request and vehicle speed that are used in different drive system control strategies, are shown. The relationships shown in FIGS. 5 and 6 are for illustrative purposes only and are not meant to be limiting. The ordinates represent operator power request, and the power request increases in the direction of the ordinate arrows. The abscissas represent vehicle speeds, and vehicle speed increases in the direction of the abscissa arrows.

Turning specifically to FIG. 5, the drive system control strategy corresponds to an electric drive system that utilizes a disconnect clutch in the higher gear ratio drive unit (e.g., the second multi-motor drive unit 110 shown in FIG. 1). Graphical region 500 indicates the ranges of vehicle speeds and power request values where the higher ratio drive unit may be operated for efficiency. In this way, efficiency gains may be achieved during low speed operation while power demand is relatively low.

Graphical region 502 indicates the ranges of vehicle speeds and power request values where both drive units are operated when a higher power request is present. As such, both drive unit are operated in tandem to rapidly achieve a higher power request, thereby increasing drive system responsiveness.

Graphical region 504 indicates the ranges of vehicle speeds and power request values where the higher ratio drive unit is disconnected and the lower ratio drive unit is operated. By disconnecting the higher ratio drive unit, the system efficiently operates at a higher speed.

Plot 506 indicates the threshold power at which the system transitions from single drive unit operation to multi drive unit operation or vice versa. For instance, when the operator power request surpasses the power threshold, the system switches to a dual drive unit control mode. Conversely, when the power request falls below the threshold, the system transitions to a single unit control mode where the higher ratio drive unit is solely operated.

Plot 508 indicates the threshold speed at which the system transitions to a single unit control mode where the lower ratio drive unit is solely operated while the higher ratio drive unit is disconnected. As such, when the vehicle speed surpasses the threshold value 508, the system may transition from the dual unit control mode to the single unit control mode where the higher ratio drive unit is disconnected or vice versa. In another instance, the system may transition from the single unit control mode where the higher ratio drive unit is solely operated to the other single unit control mode where the lower ratio drive unit is solely operated or vice versa.

Turning specifically to FIG. 6, the drive system control strategy corresponds to an electric drive system where a disconnect clutch is omitted. Graphical region 600 indicates the ranges of vehicle speeds and power request values where the higher ratio drive unit may be operated for efficiency. Conversely, graphical region 602 indicates the ranges of vehicle speeds and power request values where both drive units are operated to meet a higher power demand. Plot 604 indicates the threshold power at which the system transitions from single drive unit operation to multi drive unit operation or vice versa.

The control strategy embodied in FIG. 6 may be deployed when system simplicity is favored while the control strategy embodied in FIG. 5 may be deployed when system performance is desired. As such, the system may be tailored to meet a variety of end-use design characteristics.

Figure 7:
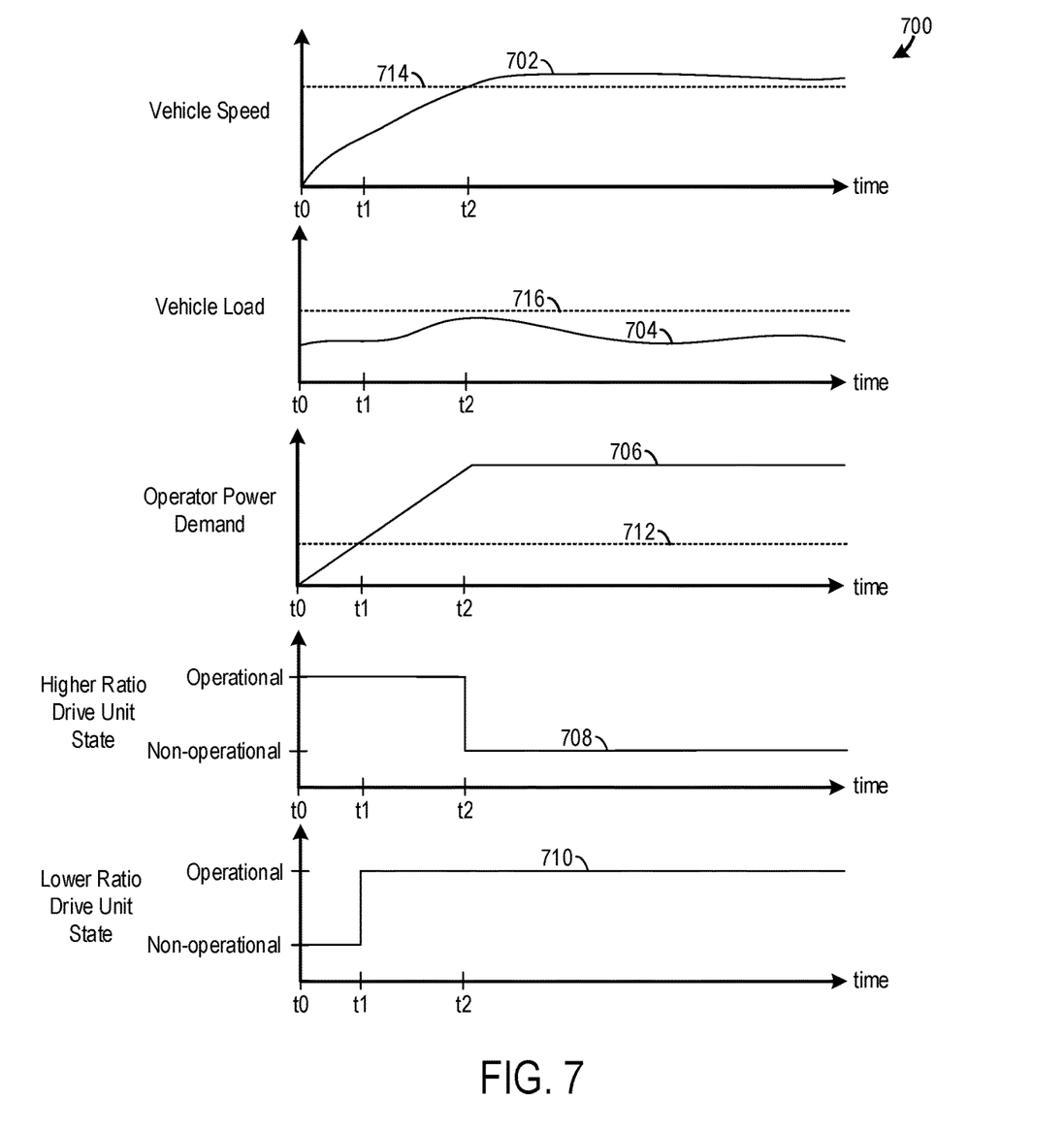
FIG. 7 is a timing diagram of a use-case electric drive system control strategy.

FIG. 7 shows a timing diagram 700 of a use-case control strategy for an electric drive system, such as any of the electric drive systems shown in FIGS. 1-3. However, a similar control strategy may be used to operate other suitable electric drive systems. In each graph of the timing diagram, time is indicated on the abscissa, increasing in the direction of the arrow. The ordinates for plots 702, 704, 706 indicate vehicle speed, vehicle load, and operator power demand, respectively. Vehicle speed, vehicle load, and operator power demand increases in the direction of the ordinate arrow. The ordinates for plots 708, 710 indicate the operating states (operational and non-operational) of the higher ratio electric drive unit and the lower ratio electric drive unit, respectively.

At t1, operator power demand surpasses a threshold value 712. This threshold value may be a non-zero value that is calculated based on motor size, motor efficiency, drive unit gear ratios, final drive ratio, vehicle weight, combinations thereof, and the like. Further, the threshold power demand may be dependent upon vehicle speed, in one example. Alternatively, the threshold power demand may be a constant value that is predetermined. Responsive to the power demand exceeding the threshold value, the lower ratio drive unit transitions to an operational state. Thus, from t1 to t2, both of the electric drive units are online and generating mechanical power.

At t2, vehicle speed surpasses a threshold value 714 indicative of cruise operation. The threshold speed value may be a non-zero value that is calculated based on motor size, motor efficiency, drive unit gear ratios, final drive ratio, vehicle weight, combinations thereof, and the like. In one example, the threshold speed may be a constant value. The system disconnects the higher ratio electric drive unit in reaction to the vehicle speed surpassing the threshold value. In this way, when a cruising speed is attained, one of the drive units may be decoupled from the axle shafts to increase system efficiency. Further, the higher ratio drive unit may be permitted to disconnect when the vehicle load is less than a threshold value 716, which again is a non-zero value. Alternatively, when the vehicle load is greater than the threshold 716, the system may inhibit disconnection of the higher ratio drive unit. In this way, both drive units may be operational while the vehicle load remains relatively high.

The technical effect of the electric drive system control methods described herein is to increase system efficiency and performance with regard to responsiveness and off the line acceleration using coordinated operation of the drive units.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric drive system is provided that comprises a first multi-motor drive unit including a first planetary gear reduction that transfers power between a first pair of motors and a first set of axle shafts; and a second multi-motor drive unit including a second planetary gear reduction that transfers power between a second pair of motors and a second set of axle shafts; wherein the first and second multi-motor drive units have asymmetric gear ratios.

In another aspect, an electric axle system is provided that comprises a first dual-motor drive unit including a first planetary gear reduction that receives power from a first pair of motors through a ring and a sun gear and delivers power to a first set of axle shafts via a carrier; and a second dual-motor drive unit including a second planetary gear reduction that receives power from a second pair of motors through a ring and a sun gear and delivers power to a second set of axle shafts via a carrier; wherein the first dual-motor drive unit has a greater gear ratio than the second dual-motor drive unit.

In yet another aspect, a method for operation of an electric drive system is provided that comprises while the electric drive system is operated under a first condition, coordinating operation of a first electric drive unit and a second electric drive unit based on a first power request; wherein the first electric drive unit includes a first planetary gear reduction that delivers power from a first pair of motors to a first set of axle shafts; wherein the second electric drive unit includes a second planetary gear reduction that delivers power from a second pair of motors to a second set of axle shafts; and wherein the first and second electric drive units have asymmetric gear ratios. In one example, the method may further comprise when vehicle speed is greater than a first threshold value, operating one of the first and second electric drive units based on a second power request. In another example the method may further comprise, while the electric drive system is operated under a second condition, operating the first electric drive unit while the second electric drive unit is inoperative based on a second power request less than the first power request. In yet another example, the method may further comprise disconnecting the first electric drive unit through operation of a disconnect clutch, wherein the first electric drive unit has a higher gear ratio than the second electric drive unit. Still further in another example, the method may further comprise partially disconnecting the first electric drive unit through operation of a disconnect clutch based on load splitting ratio between the first electric drive unit and the second electric drive unit.

In yet another aspect, a continuously variable electric drive system is provided that comprises a first multi-motor drive unit with a first planetary gear reduction that delivers power from a first pair of motors to a first drive axle; and a second multi-motor drive unit with a second planetary gear reduction that delivers power from a second pair of motors to a second drive axle; and a controller comprising: instructions that when executed by a processor cause the controller to: selectively coordinate operation of the first and second multi-motor drive units based on a power request; wherein the first and second multi-motor drive units have asymmetric gear ratios.

In another aspect, a continuously variable electric drive system is provided that comprises a first dual-motor drive unit with a first planetary gear reduction that delivers power from a first pair of motors to a first drive axle; and a second dual-motor drive unit with a second planetary gear reduction that delivers power from a second pair of motors to a second drive axle; and a controller comprising: instructions that when executed by a processor cause the controller to: selectively coordinate operation of the first and second dual-motor drive units based on a power request; wherein the first and second dual-motor drive units have asymmetric gear ratios.

In any of the aspects or combinations of the aspects, a first motor and a second motor in the first pair of motors of the first multi-motor drive unit may have a common rotational axis.

In any of the aspects or combinations of the aspects, the first motor and the second motor may be positioned on opposing axial sides of an output gear.

In any of the aspects or combinations of the aspects, a first motor and a second motor in the first multi-motor drive unit may have rotational axes that are arranged parallel to one another.

In any of the aspects or combinations of the aspects, the first and second motors may be arranged adjacent to one another on one axial side of an output gear.

In any of the aspects or combinations of the aspects, the first and second motors may be positioned laterally between two opposing vehicle frame rails.

In any of the aspects or combinations of the aspects, a first motor and a second motor of the first pair of motors in the first multi-motor drive unit may have a common rotational axis and wherein a first motor and a second motor of the second pair of motors in the second multi-motor drive unit have rotational axes that are arranged parallel to one another.

In any of the aspects or combinations of the aspects, the first and second sets of axle shafts may be included in a non-steerable tandem drive axle.

In any of the aspects or combinations of the aspects, the electric drive system may further comprise a clutch arranged between one of the first and second multi-motor drive units and an output of the electric drive system.

In any of the aspects or combinations of the aspects, each of the motors in the first and second pairs of motors may be motor-generators.

In any of the aspects or combinations of the aspects, the first planetary gear reduction may have a ratio less than 10:1 and the second planetary gear reduction has a ratio greater than 10:1.

In any of the aspects or combinations of the aspects, each of the first and second multi-motor drive units may have a continuously variable gear ratio.

In any of the aspects or combinations of the aspects, a first motor and a second motor in the first dual-motor drive unit and the first planetary gear reduction may be coaxially arranged and an output gear may be radially offset from the first motor, the second motor, and the first planetary gear reduction.

In any of the aspects or combinations of the aspects, rotational axes of the first pair of motors in the first dual-motor drive unit may be parallel to one another and wherein rotational axes of the second pair of motors in the second dual-motor drive unit may be parallel to one another.

In any of the aspects or combinations of the aspects, the first and second dual-motor drive units may be positioned laterally between a pair of frame rails.

In any of the aspects or combinations of the aspects, the first and second sets of axle shafts may be included in beam axles configured to attach to a dependent suspension system.

In any of the aspects or combinations of the aspects, the first dual-motor drive unit may have a disconnect clutch positioned between an output of the first planetary gear reduction and an output gear of the electric axle system.

In any of the aspects or combinations of the aspects, the first and second planetary gear reductions may be simple planetary gear reductions and the first and second dual-motor drive units each may have a continuously adjustable gear ratio.

In any of the aspects or combinations of the aspects, the first and second planetary gear reductions may not include clutches or brakes.

In any of the aspects or combinations of the aspects, coordinating operation of the first electric drive unit and the second electric drive unit may include coordinating operation of the first and second electric drive units based on an efficiency of the first electric drive unit and an efficiency of the second electric drive unit.

In any of the aspects or combinations of the aspects, the first and second conditions may be conditions where vehicle speed is less than the first threshold value.

In any of the aspects or combinations of the aspects, the first condition may be a first launch condition where the electric drive system initiates operation from a zero speed value and the first power request may be greater than a second threshold value.

In any of the aspects or combinations of the aspects, the second condition may be a second launch condition where the electric drive system initiates operation from the zero speed value and where the first power request may be less than the second threshold value.

In any of the aspects or combinations of the aspects, the controller may further comprise instructions that when executed, during a second launch condition, cause the controller to: operate the first multi-motor drive unit while the second multi-motor drive unit is inoperative; wherein the second launch condition is a condition where the first power request is less than a threshold value and the first launch condition is a condition where the first power request is greater than the threshold value.

In any of the aspects or combinations of the aspects, the controller may further comprise instructions that when executed, during a cruise condition, cause the controller to: operate the second multi-motor drive unit while the first multi-motor drive unit is disconnected.

In any of the aspects or combinations of the aspects, the cruise condition may be a condition when vehicle speed is above a threshold value and the first power request is below a threshold value.

In any of the aspects or combinations of the aspects, operating the first and second multi-motor drive units in tandem based on the first power request, may include operating the first and second multi-motor drive units to maintain each of the first and second multi-motor drive units within a target efficiency range.

In any of the aspects or combinations of the aspects, operating the first and second multi-motor drive units in tandem based on the first power request may include operating a disconnect clutch coupled to one of the first and second multi-motor drive units to partially disengage two sets of plates in the clutch based on an efficiency set-point.

In any of the aspects or combinations of the aspects, selectively coordinating operation of the first and second dual-motor drive units based on the power request may include: while vehicle speed is less than a first threshold value and a power request is less than a second threshold value, operating one of the first and second dual-motor drive units.

In any of the aspects or combinations of the aspects, selectively coordinating operation of the first and second dual-motor drive units based on the power request may include while vehicle speed is less than the first threshold value and the power request is greater than the second threshold value, operating the first and second dual-motor drive units in tandem.

In any of the aspects or combinations of the aspects, wherein selectively coordinating operation of the first and second dual-motor drive units based on the power request may include while vehicle speed is greater than the first threshold value, operate one of the first and second dual-motor drive units while a disconnect clutch coupled to the other one of the first and second dual-motor drive units and the corresponding drive axle is disengaged.

In any of the aspects or combinations of the aspects, selectively coordinating operation of the first and second dual-motor drive units based on the power request may include coordinating operation of the first and second dual-motor drive units based on an efficiency of the first dual-motor drive unit and an efficiency of the second dual-motor drive unit.

In another representation, a tandem electric axle system is provided that includes a first beam axle assembly with a first continuously variable dual-motor drive unit and a second beam axle with a second continuously variable dual-motor drive unit, wherein the second continuously variable dual-motor drive unit has a planetary gear reduction with a greater gear ratio than a planetary gear reduction in the first continuously variable dual-motor drive unit.

As used herein, the terms "approximately" and "substantially" are construed to mean plus or minus five percent of the range, unless otherwise specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or electric drive system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive system, comprising:
a first multi-motor drive unit including a first planetary gear reduction that transfers power between a first pair of motors and a first set of axle shafts; and
a second multi-motor drive unit including a second planetary gear reduction that transfers power between a second pair of motors and a second set of axle shafts;
wherein the first and second multi-motor drive units have asymmetric gear ratios.

2. The electric drive system of claim 1, wherein a first motor and a second motor in the first pair of motors of the first multi-motor drive unit have a common rotational axis.

3. The electric drive system of claim 2, wherein the first motor and the second motor are positioned on opposing axial sides of an output gear.

4. The electric drive system of claim 1, wherein a first motor and a second motor in the first multi-motor drive unit have rotational axes that are arranged parallel to one another.

5. The electric drive system of claim 4, wherein the first and second motors are arranged adjacent to one another on one axial side of an output gear.

6. The electric drive system of claim 3, wherein the first and second motors are positioned laterally between two opposing vehicle frame rails.

7. The electric drive system of claim 1, wherein a first motor and a second motor of the first pair of motors in the first multi-motor drive unit have a common rotational axis, and wherein a first motor and a second motor of the second pair of motors in the second multi-motor drive unit have rotational axes that are arranged parallel to one another.

8. The electric drive system of claim 1, wherein the first and second sets of axle shafts are included in a non-steerable tandem drive axle.

9. The electric drive system of claim 1, further comprising a clutch arranged between one of the first and second multi-motor drive units and an output of the electric drive system.

10. The electric drive system of claim 1, wherein each of the motors in the first and second pairs of motors are motor-generators.

11. The electric drive system of claim 1, wherein the first planetary gear reduction has a ratio less than 10:1 and the second planetary gear reduction has a ratio greater than 10:1.

12. The electric drive system of claim 1, wherein each of the first and second multi-motor drive units have a continuously variable gear ratio.

13. An electric axle system, comprising:
- a first dual-motor drive unit including a first planetary gear reduction that receives power from a first pair of motors through a ring and a sun gear and delivers power to a first set of axle shafts via a carrier; and
- a second dual-motor drive unit including a second planetary gear reduction that receives power from a second pair of motors through a ring and a sun gear and delivers power to a second set of axle shafts via a carrier;
- wherein the first dual-motor drive unit has a greater gear ratio than the second dual-motor drive unit.

14. The electric axle system of claim 13, wherein a first motor and a second motor in the first dual-motor drive unit and the first planetary gear reduction are coaxially arranged and an output gear is radially offset from the first motor, the second motor, and the first planetary gear reduction.

15. The electric axle system of claim 14, wherein:
rotational axes of the first pair of motors in the first dual-motor drive unit are parallel to one another; and
rotational axes of the second pair of motors in the second dual-motor drive unit are parallel to one another.

16. The electric axle system of claim 13, wherein the first and second dual-motor drive units are positioned laterally between a pair of frame rails.

17. The electric axle system of claim 16, wherein the first and second sets of axle shafts are included in beam axles configured to attach to a dependent suspension system.

18. The electric axle system of claim 13, wherein the first dual-motor drive unit has a disconnect clutch positioned between an output of the first planetary gear reduction and an output gear of the electric axle system.

19. The electric axle system of claim 13, wherein the first and second planetary gear reductions are simple planetary gear reductions and wherein the first and second dual-motor drive units each have a continuously adjustable gear ratio.

20. The electric axle system of claim 13, wherein the first and second planetary gear reductions do not include clutches or brakes.

* * * * *